United States Patent [19]

Beguin et al.

[11] 4,256,656
[45] Mar. 17, 1981

[54] MESOMORPHOUS 4-ALKOXYTETRAFLUOROBENZOIC ACID ESTERS

[75] Inventors: Alain Béguin; Jean-Claude Dubois; Annie Zann, all of Paris, France

[73] Assignee: Thomson-CSF, Paris, France

[21] Appl. No.: 89,157

[22] Filed: Oct. 29, 1979

[30] Foreign Application Priority Data

Oct. 27, 1978 [FR] France .................. 78 30605

[51] Int. Cl.³ .................. C07C 69/92; C07C 121/75; C09K 3/34
[52] U.S. Cl. .................. 260/465 D; 252/299; 260/544 D; 544/314; 544/316; 544/318; 544/334; 544/335; 546/288; 546/296; 546/302; 560/65; 562/474
[58] Field of Search .................. 260/456 D; 560/65; 562/474; 252/299; 544/314, 316, 318, 334, 335; 546/288, 296, 302

[56] References Cited

U.S. PATENT DOCUMENTS

| | | | |
|---|---|---|---|
| 3,915,883 | 10/1975 | Van Meter et al. | 560/65 X |
| 4,110,243 | 8/1978 | Abert-Mellah et al. | 252/299 |
| 4,173,545 | 11/1979 | Beguin et al. | 252/299 |

OTHER PUBLICATIONS

Deacon et al., *Aust. J. Chem.*, 23(7), pp. 1359–1366 (1970).

*Primary Examiner*—Dolph H. Torrence
*Attorney, Agent, or Firm*—Oblon, Fisher, Spivak, McClelland & Maier

[57] ABSTRACT

The invention relates to an organic compound having an enantiotropic or monotropic mesomorphous phase.

The compound according to the invention complies with the general chemical formula:

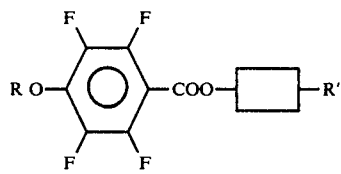

in which R is an alkyl radical, R' another alkyl radical or an alkoxy radical and the symbol ☐ is a radical which can either be an aromatic nucleus or a radical with two aromatic nuclei or a cyclohexane radical or contain at least one cyclohexane radical or a heterocycle of type

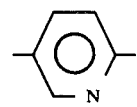

6 Claims, No Drawings

MESOMORPHOUS 4-ALKOXYTETRAFLUOROBENZOIC ACID ESTERS

BACKGROUND OF THE INVENTION

The invention relates to an organic mesomorphous compound whose chemical formula is derived from a 4-alkoxytetrafluorobenzoic acid. The pure compound, the mixtures of this compound with other mesomorphous compounds and finally the synthesis of this compound form part of the invention, together with the liquid crystals obtained in this way.

Several compounds of the same series have at least one enantiotropic or monotropic phase and can therefore be used as liquid crystals either in the pure state or mixed with substances of the series or other liquid crystals.

BRIEF SUMMARY OF THE INVENTION

The mesomorphous organic compound according to the invention is in accordance with the following general formula:

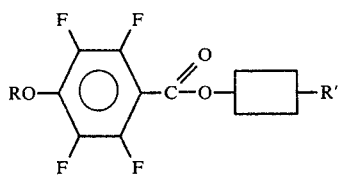

in which R designates an alkyl radical with n carbon atoms (n being an integer from 1 to 15) and R' designates either an element such as hydrogen, fluorine, chlorine, bromine, iodine or a radical such as $CF_3$, $CN$, $C_m H_{2m+1}$, $C_m H_{2m+1} O$ (m being an integer from 1 to 15).

The symbol ☐ either represents an absence of the radical or a radical with two free bonds such as: an aromatic nucleus or a more complex radical containing at least two aromatic nuclei such as:

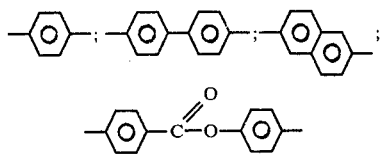

or a cyclohexane radical or a more complex radical containing at least one cyclohexane radical:

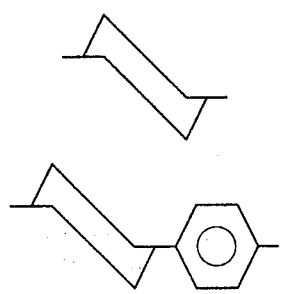

or a heterocycle such as:

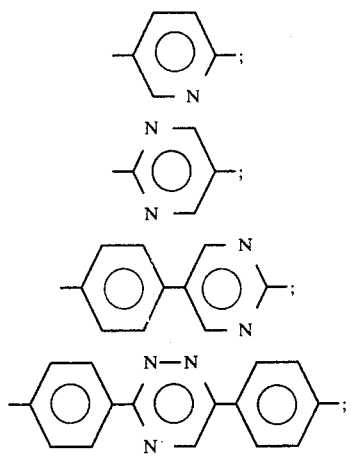

GENERAL SYNTHESIS DIAGRAM OF A COMPOUND ACCORDING TO THE INVENTION.

The production of a compound according to the invention involves three main reactions (only one reaction when R'=H and ☐ =O).

(1) In the liquid phase essentially comprising ROH (R being an alkyl radical) RONa is reacted with pentafluorobenzoic acid:

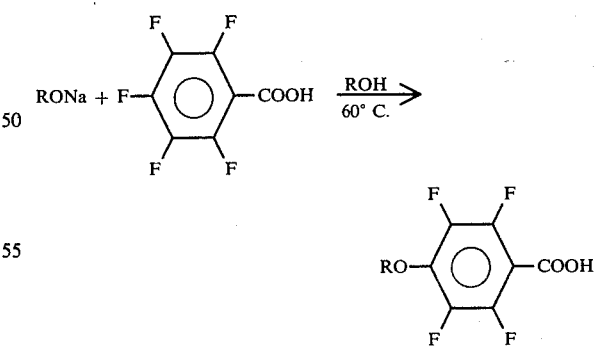

to obtain 4-alkoxytetrafluorobenzoic acid, the optimum reaction period being between 30 and 50 hours. The substance obtained is a compound according to the invention in the particular case where R'=H and ☐ =zero.

(2) This is followed by a conventional acid chloride synthesis reaction

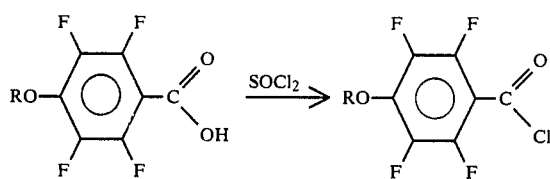

(3) Finally, there is a conventional esterification reaction of the above-obtained chloride:

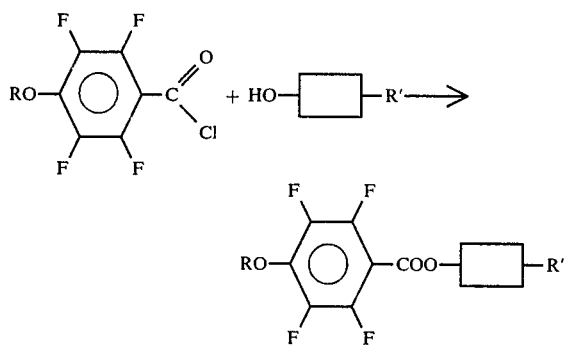

SYNTHESIS EXAMPLE

Consideration is given to the case of:

R = C$_6$H$_{13}$;
R' = C N

The three reactions of the synthesis diagram give rise to the following operating procedures:

(1) 4-HEXYLOXYTETRAFLUORUBENZOIC ACID SYNTHESIS 5 g (0.22 mol) of sodium fragments are added to 500 ml of 1-hexanol. The hexanolate is allowed to form, followed by the addition of 21.2 g (0.1 mol) of pentafluorobenzoic acid. The temperature of the solution is raised to 60° C. for 44 hours. The solution is then poured into 800 cc of water, followed by acidification with 5 N hydrochloric acid (approx. 40 cc). The solution is extracted with ether, washed and then dried on sodium sulphate. The solvent is distilled. 30.1 g of crude product is collected which is recrystallized twice with hexane. 10 g of pure product is obtained, i.e. a yield of 34%.

The transition temperatures of this product are given in Table I and specifically example No. 6.

(2) ACID CHLORIDE FORMATION REACTION 1.5 ml of thionyl chloride are added to 2.94 g ($10^{-2}$ mol) of 4-hexyloxytetrafluorobenzoic acid. Refluxing takes place for 2 hours, followed by the distillation of the excess thionyl chloride. 3.12 g of 4-hexyloxytetrafluorobenzoyl chloride are collected, i.e. a 100% yield.

(3) FINAL REACTION 625 mg ($2.10^{-3}$ mol) of 4-hexyloxytetrafluorobenzoyl chloride are added to a solution of 390 mg ($2.10^{-3}$ mol) of 4-hydroxy-4'-cyanobiphenyl in 2.5 ml of pyridine. Stirring takes place at ambient temperature for 22 hours, followed by pouring into a mixture of 25 g of ice and 2 cc of concentrated sulphuric acid. Ether extraction takes place, followed by the washing of the organic solution with water and drying on sodium sulphate.

The ether is distilled. 900 mg of crude product are collected, which is purified by silica column chromatography with toluene elution. The product obtained is recrystallized with ethanol. 650 mg of p-cyanobiphenyl-4-hexyloxytetrafluorobenzoate are obtained, the yield being approximately 70%.

The transition temperatures of this product appear under example No 21 of Table I.

TABLE I

The conventions adopted in the following Table are:
K : solid crystalline phase
N = nematic phase
I : isotropic phase
S$_A$ : type A smectic phase; (.57): phase observed below the melting point, i.e. below 57° C. (for example).
All the temperatures are in degrees Celsius

| Example No | R | ☐ | R' | K | S$_A$ | N | I |
|---|---|---|---|---|---|---|---|
| 1 | CH$_3$ | — | H | . | | 122 | . |
| 2 | C$_2$H$_5$ | — | H | . | | 114.5 | . |
| 3 | C$_3$H$_7$ | — | H | . | | 84 | . |
| 4 | C$_4$H$_9$ | — | H | . | | 87 | (.57) . |
| 5 | C$_5$H$_{11}$ | — | H | . | | 51 | (.48) . |
| 6 | C$_6$H$_{13}$ | — | H | . | | 53.5 | (.52.5) . |
| 7 | C$_7$H$_{15}$ | — | H | . | | 60 | . |
| 8 | C$_8$H$_{17}$ | — | H | . | | 67 | . |
| 9 | C$_7$H$_{15}$ | 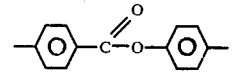 | CN | . | | 39.5 | . |
| 10 | C$_8$H$_{17}$ | 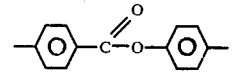 | CF$_3$ | . | | 45 | (.19) . |
| 11 | C$_2$H$_5$ | Note (a) | C$_5$H$_{11}$ | . | | 98 | .168.5 . |
| 12 | C$_3$H$_7$ | Note (a) | C$_5$H$_{11}$ | . | | 100 | .163 . |
| 13 | C$_7$H$_{15}$ | Note (a) | C$_5$H$_{11}$ | . | | 103 | .144 . |
| 14 | C$_8$H$_{17}$ | Note (a) | C$_5$H$_{11}$ | . | | 98 | .140 . |
| 15 | C$_6$H$_{13}$ | Note (b) | C$_6$H$_{13}$ | .81 | | | .132 . |
| 16 | C$_7$H$_{15}$ | Note (b) | C$_6$H$_{13}$ | .81.5 | | | .127 . |
| 17 | C$_2$H$_5$ | Note (b) | CN | .131 | | | .223 . |
| 18 | C$_3$H$_7$ | Note (b) | CN | .98 | | | .212.5 . |
| 19 | C$_4$H$_9$ | Note (b) | CN | .74 | | | .207 . |
| 20 | C$_5$H$_{11}$ | Note (b) | CN | .68 | | | .193.5 . |
| 21 | C$_6$H$_{13}$ | Note (b) | CN | .75 | (.35) | | .187 . |
| 22 | C$_7$H$_{15}$ | Note (b) | CN | .68.5 | | | .176.5 . |
| 23 | C$_8$H$_{17}$ | Note (b) | CN | .66 | .120 | | .172 . |

Note (a):

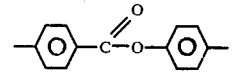

Note (b):

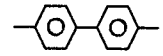

It can be seen that certain temperature ranges in which the liquid crystal is nematic are remarkably wide. It is possible to obtain temperature ranges including ambient temperature by using the mixtures of compounds according to the invention.

The liquid crystals obtained in this way have the following advantages:
their great thermal stability, e.g. up to 230° C. in the case of compound No 21, as is shown by a thermogravimetric measurement,
the facility with which their alignment is obtained, e.g. alignment parallel to the electrodes (homeotrope) by silicon monoxide surface treatment and perpendicular alignment by treating the electrodes with a long chain paraffin silane deposit;

great positive anisotropy for compounds having a CN radical, particularly examples 17 to 24.

Table II gives the values for respectively parallel $\epsilon \parallel$ and perpendicular $\epsilon \perp$ dielectric constants defined as in the case of orientation in a very large amplitude magnetic field, but in this particular case by orienting the molecules of the liquid crystal by the alignment methods referred to hereinbefore. The third column of the Table gives the difference between these two constants $\epsilon_a$, which is the anisotropy of the liquid crystal. The lines in the Table correspond to three different measuring temperatures. An alternating current voltage difference of frequency 10 kHz is applied between the electrodes.

TABLE II

| T°C | $\epsilon \parallel$ | $\epsilon \perp$ | $\epsilon_a$ |
|---|---|---|---|
| 84 | 14.90 | 5.76 | 9.14 |
| 93 | 14.60 | 5.69 | 8.91 |
| 103 | 14.40 | 5.63 | 8.77 |

The pure or mixed compounds can be used in visual display devices of the following types:

twisted nematic, for compounds which are only nematic thermooptic with memory, for compounds having a smectic phase A.

Compounds which do not have a mesomorphous phase in the pure state can be used in liquid crystal devices by mixing them with other compounds having a mesomorphous phase. Such mixtures generally have the advantage of a wider temperature range.

What is claimed is:

1. A mesomorphous organic compound having the formula

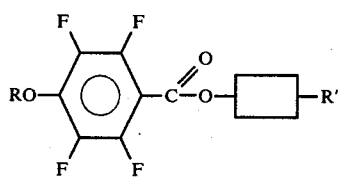

wherein R designates an alkyl radical having 1-15 carbon atoms, R' designates hydrogen, chlorine, bromine, iodine, CF$_3$, CN, C$_m$H$_{2m+1}$ or C$_m$H$_{2m+1}$O wherein m is an integer from 1 to 15, ▢ is a radical selected from the group consisting of:

an aromatic radical of the formula

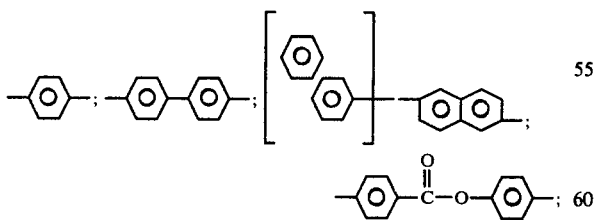

a cyclohexane radical of the formula

or a heterocyclic radical of the formula

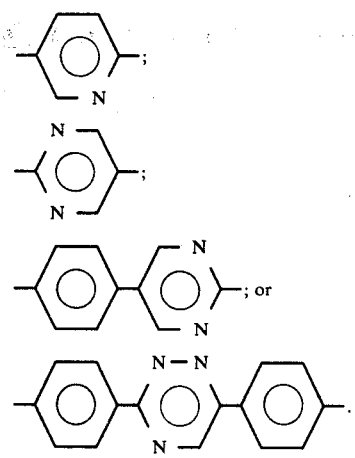

2. An organic compound according to claim 1, wherein

R is C$_7$H$_{15}$, the symbol 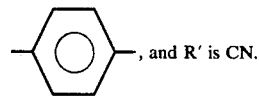 is

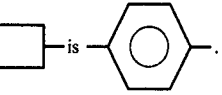, and R' is CN.

3. An organic compound according to claim 1, wherein

R is C$_8$H$_{17}$ and the symbol —▢— is —⌬—.

4. An organic compound according to claim 1, having the formula

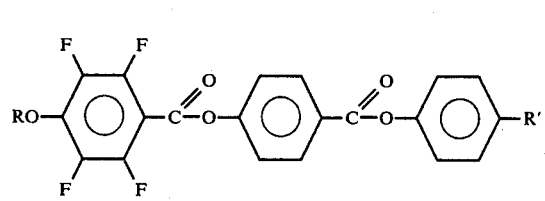

wherein

R is C$_2$H$_5$, C$_3$H$_7$, C$_7$H$_{15}$ or C$_8$H$_{17}$; and

R' is C$_5$H$_{11}$.

5. An organic compound according to claim 1, having the formula

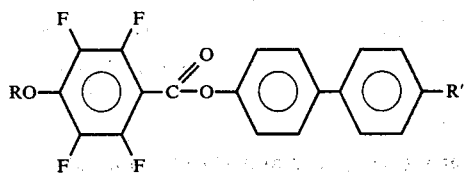
wherein
R is $C_2H_5$, $C_3H_7$, $C_4H_9$, $C_5H_{11}$, $C_6H_{13}$, $C_7H_{15}$ or $C_8H_{17}$; and
R' is CN.
6. An organic compound according to claim 1, having the formula
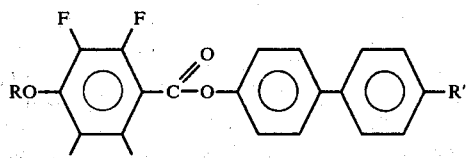
wherein
R is $C_6H_{13}$ or $C_7H_{15}$ and
R' is $C_6H_{13}$.
* * * * *

UNITED STATES PATENT AND TRADEMARK OFFICE
CERTIFICATE OF CORRECTION

PATENT NO. : 4,256,656
DATED : March 17, 1981
INVENTOR(S) : Alain Béguin; Jean-Claude Dubois; Annie Zann It is certified that error appears in the above—identified patent and that said Letters Patent is hereby corrected as shown below:

Column 4, line 19, in the legend of Table 1,

"(.57): Phase observed below the melting point, i.e. below 57°C (for example)"

Preceding should begin new line.

Column 4, lines 23-38, in Table 1, wherein the column of numbers under $S_A$ starting with 122 and continuing through 98 should be under heading K, above the K value .81 for example no. 15.

Signed and Sealed this

*Twenty-second* Day of *December 1981*

|SEAL|

Attest:

GERALD J. MOSSINGHOFF

*Attesting Officer*     *Commissioner of Patents and Trademarks*